United States Patent [19]

Paganus

[11] Patent Number: 5,350,147
[45] Date of Patent: Sep. 27, 1994

[54] OMNIPOSITIONAL POD FOR CAMERA

[76] Inventor: Thomas J. Paganus, 187 Lindsay Ct., Franklin Township, Somerset County, N.J. 08823

[21] Appl. No.: 137,961

[22] Filed: Oct. 19, 1993

[51] Int. Cl.$^5$ .............................................. A47B 91/00
[52] U.S. Cl. ................................... 248/346; 248/176; 248/910; 354/293
[58] Field of Search ............... 248/346, 688, 176, 910, 248/181, 179; 354/293

[56] References Cited

U.S. PATENT DOCUMENTS

| | | |
|---|---|---|
| 1,656,852 | 1/1928 | Aspis . |
| 2,219,974 | 10/1940 | Bellow .......................... 248/910 X |
| 3,126,187 | 3/1963 | Mooney .......................... 354/293 X |
| 4,162,696 | 7/1979 | Sprung . |
| 4,294,424 | 10/1981 | Teissier .......................... 248/910 X |
| 4,328,917 | 5/1982 | Reeberg .......................... 354/293 X |
| 4,346,895 | 8/1982 | Brownlee .......................... 248/910 |
| 4,554,692 | 11/1985 | Whitehead .......................... 248/916 X |
| 4,606,524 | 8/1986 | Conee . |
| 4,763,151 | 8/1988 | Klinger .......................... 248/179 X |
| 4,870,440 | 9/1989 | Frost . |
| 4,915,333 | 4/1990 | Bolondi .......................... 248/181 |

FOREIGN PATENT DOCUMENTS 2906464 8/1980 Fed. Rep. of Germany ...... 354/293
622680 5/1949 United Kingdom ............... 248/910

Primary Examiner—J. Franklin Foss
Attorney, Agent, or Firm—Stephen J. Driscoll

[57] ABSTRACT

The present invention is directed at an omnipositional pod for supporting a device such as a camera. The pod comprises a cushion for supporting the device, a fluid material contained within the cushion, a fastener mounted to the cushion being attachable to the device, and possibly a strap mounted to the cushion which creates a loop when fastened.

16 Claims, 6 Drawing Sheets

OMNIPOSITIONAL POD FOR CAMERA

BACKGROUND OF THE INVENTION

1. Field of the Invention

The present invention relates generally to a stand, and more specifically to a cushion to stabilize a camera, a video camcorder, or other mobile device which requires stability.

2. Information Disclose Statement

Taking photographs often requires stabilizing the camera, especially when photographing at low light levels, or when using a timer. This has traditionally been accomplished using a tripod, however, a tripod has several limitations. First, it must be set up which takes time and may result in loosing a "photo opportunity." Second, a tripod requires flat area to anchor each of its three legs. This can pose an insurmountable obstacle on particularly irregular surfaces. Finally, tripods can be cumbersome, making them awkward to transport.

The prior art teaches the use of a cushion to stabilize a camera. For example, in U.S. Pat. No. 4,606,524, Conee teaches a cushion filled with free flowing particulate and means to maintain the cushion's shape. Likewise, in U.S. Pat. No. 4,162,696, Sprung teaches a bag to support the camera which also forms a camera case. These inventions partially overcome the shortcomings of tripods because they eliminate set-up time, and enable the user to place the camera on irregular surfaces.

Both of these inventions, however, are limited in their use on irregular surfaces. That is, neither invention provides a positive means to anchor the camera to the cushion; the camera is held in place only by friction. Consequently, if the incline of the cushion becomes too great, the camera may slide off. This would ruin not only the shot, but also the camera.

In addition to the camera sliding off the cushion, the prior art is also limited in that the cushion may slide off the object on which it rests. Neither Conee or Sprung provides a strap or means of attaching the cushion to an object for stability; friction must hold the cushion in place. Consequently, the cushion must be placed on essentially horizontal, stationary surfaces.

Therefore, the prior art is restricted by the friction between both the camera and the cushion, and the cushion and the object on which it rests. This limits the photographer to essentially horizontal, stationary shots. The present invention removes these limitations.

SUMMARY OF THE INVENTION

The present invention is directed at a cushion to support and stabilize a camera. An object of the present invention is to provide a positive means to attach the camera to the cushion. Another object of the invention is to provide means to anchor the cushion. The combination of these two improvements has a synergistic effect—gravity and friction are removed as limitations. Therefore, the present invention can be suspended upside-down, or attached to a moving object. This innovative design will broaden a photographer's array of "photo opportunities."

DETAILED DESCRIPTION OF THE INVENTION

Figure 1:
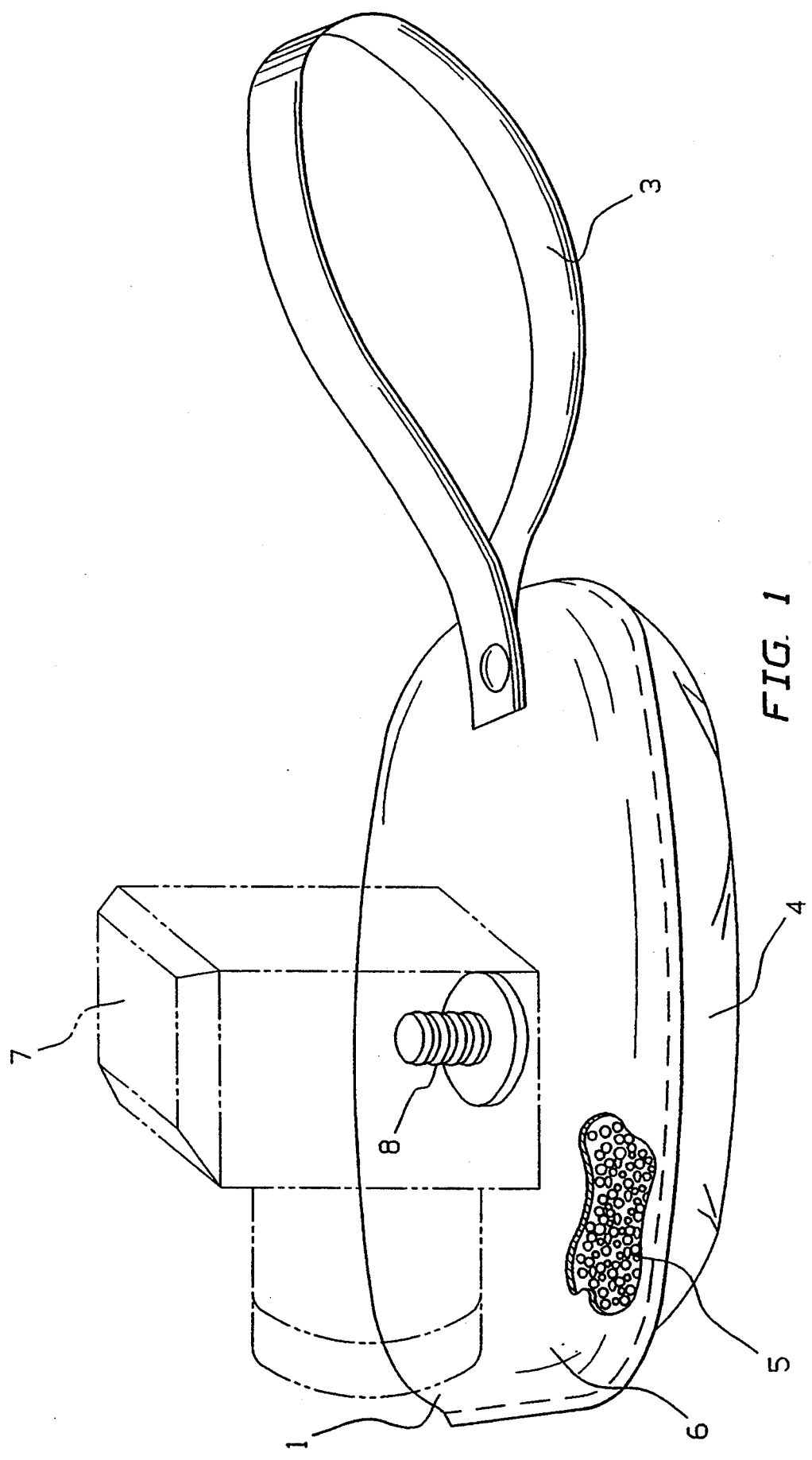
FIG. 1 depicts one preferred embodiment of the invention.

Referring to FIG. 1, a preferred embodiment of the invention is shown. A cushion 1 has a top side 6, a bottom side 4, a strap 3, and a fastener 8. Top side 6 and bottom side 4 may consist of the same piece of material which is merely folded in half and sewn together on three sides. However, to increase cushion 1's ability to hold fast to irregular and inclined surfaces, a skid resistant material, such as rubberized material, could be used on bottom side 4.

Cushion 1 is filled with a fluid substance 5. Fluid substance 5 refers to free flowing solid particles. One preferred embodiment of fluid substance 5 consists of using a combination of polypropylene pellets and tin shot. This combination would provide flexible yet firm support for a device 7, and also provide stabilizing "ballast" for cushion 1.

Figure 2:
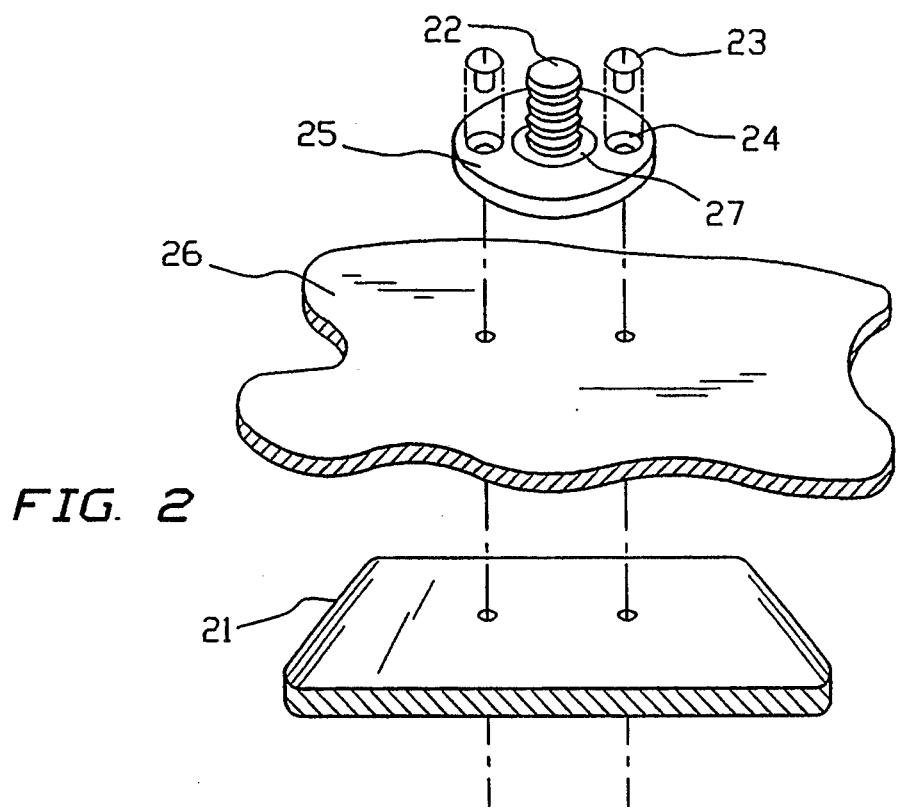
FIG. 2 details one preferred embodiment of the fastener which attaches the cushion to the camera.

FIG. 1 shows fastener 8 which attaches cushion 1 to device 7 which could be a camera, a video camera, or any device which requires stability. A detailed depiction of the fastener is given in FIG. 2. In FIG. 2, a device would screw on to threaded stud 22. Threaded stud 22 is integrally formed with a top plate 25. Top plate 25 contains a rubber stopper 27 at the junction of threaded stud 22 and top plate 25 which is shock resistant to cushion the mounted device from top plate 25, and skid resistant to restrain the mounted device from turning on said threaded stud.

Top plate 25 also contains holes 24 to receive rivets 23. To achieve a flush surface on top plate 25, holes 24 form a recess deep enough and wide enough to accommodate the head of rivets 23. Rivets 23 enter through top plate 25, pierce top side 26 of the cushion, and attach to a bottom plate 21. Thus, rivets 23 hold top plate 25 and bottom plate 21 in intimate contact with the cushion. Bottom plate 21 is large enough to adequately anchor threaded stud 22 so that it can support the mounted device. Moreover, bottom plate contains smooth edges to prevent tearing the cushion.

Figure 3:
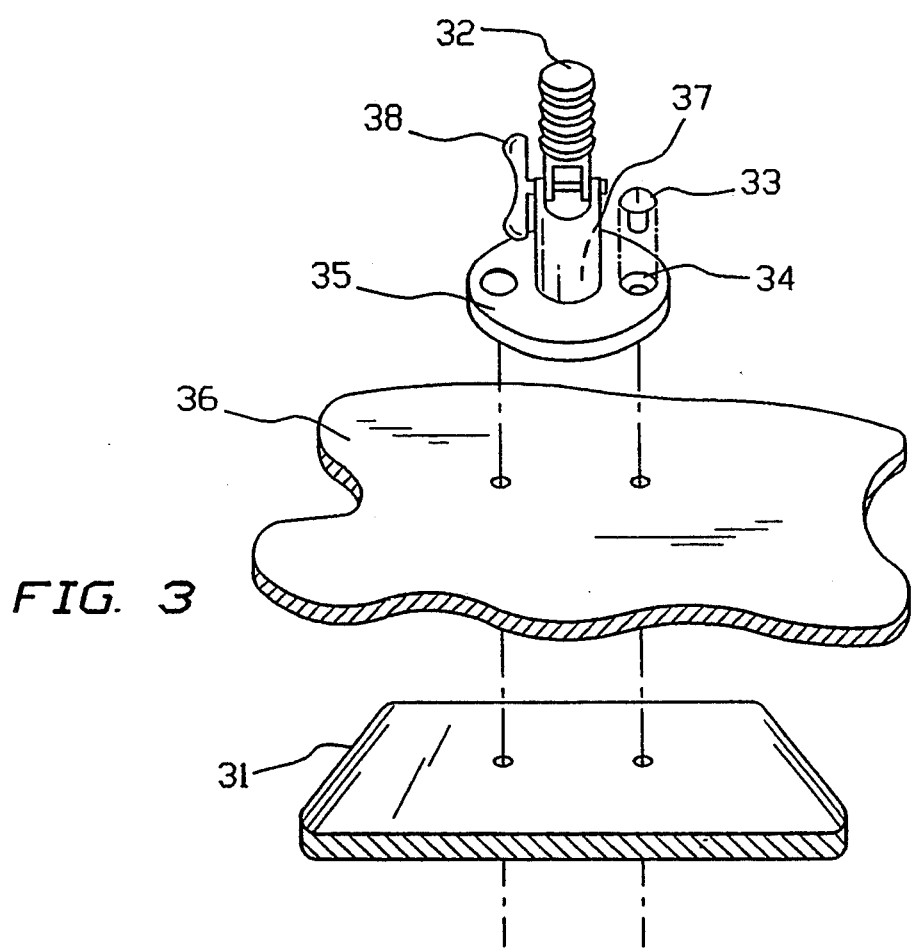
FIG. 3 details another preferred embodiment of the fastener, this embodiment uses a swivel to allow camera movement while the cushion remains still.
Figure 4:
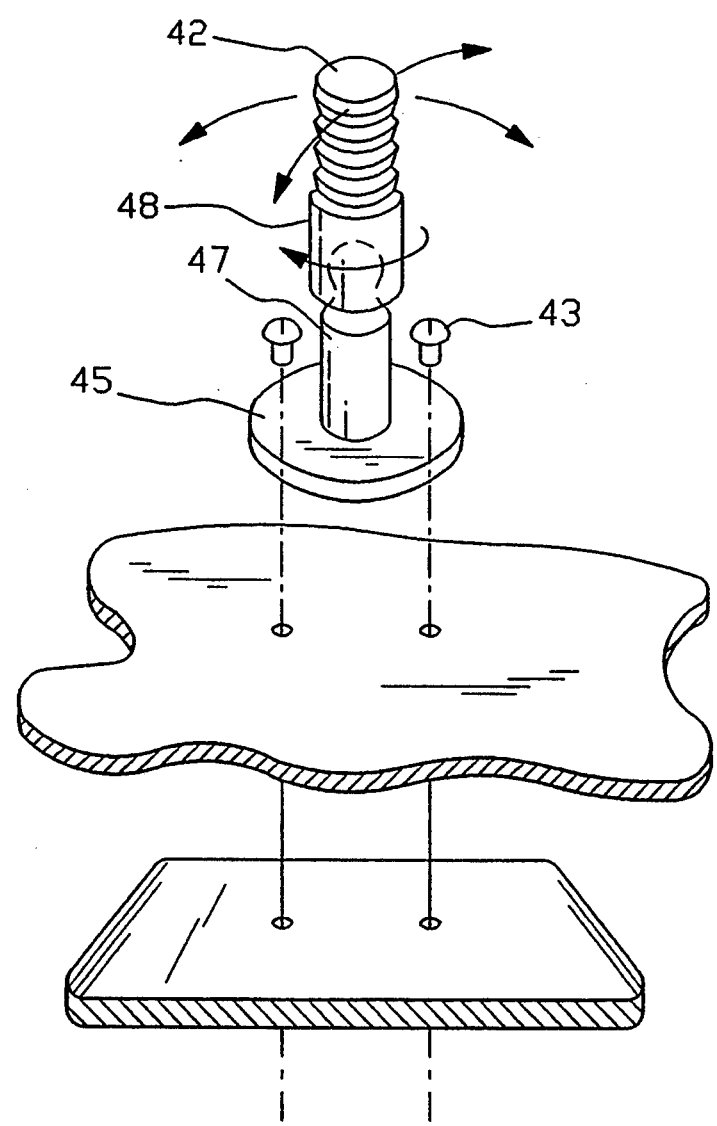
FIG. 4 details yet another preferred embodiment of the fastener which again allows camera movement while the cushion remains still.

In addition to a straight stud, other fastener devices can be used. For example, a preferred embodiment uses a swivel device in FIG. 3. In FIG. 3, a swivel 37 attaches to a top plate 35, and to a threaded stud 32. This particular embodiment shows a butterfly screw 38 which holds threaded stud 32 rigid when tightened. A variation of the concept is represented in FIG. 4. There, a ball 47 and a socket 48 connect a threaded stud 42 to a top plate 45. Both these embodiment allow the mounted device to swivel while the cushion remains stationary.

Figure 5:
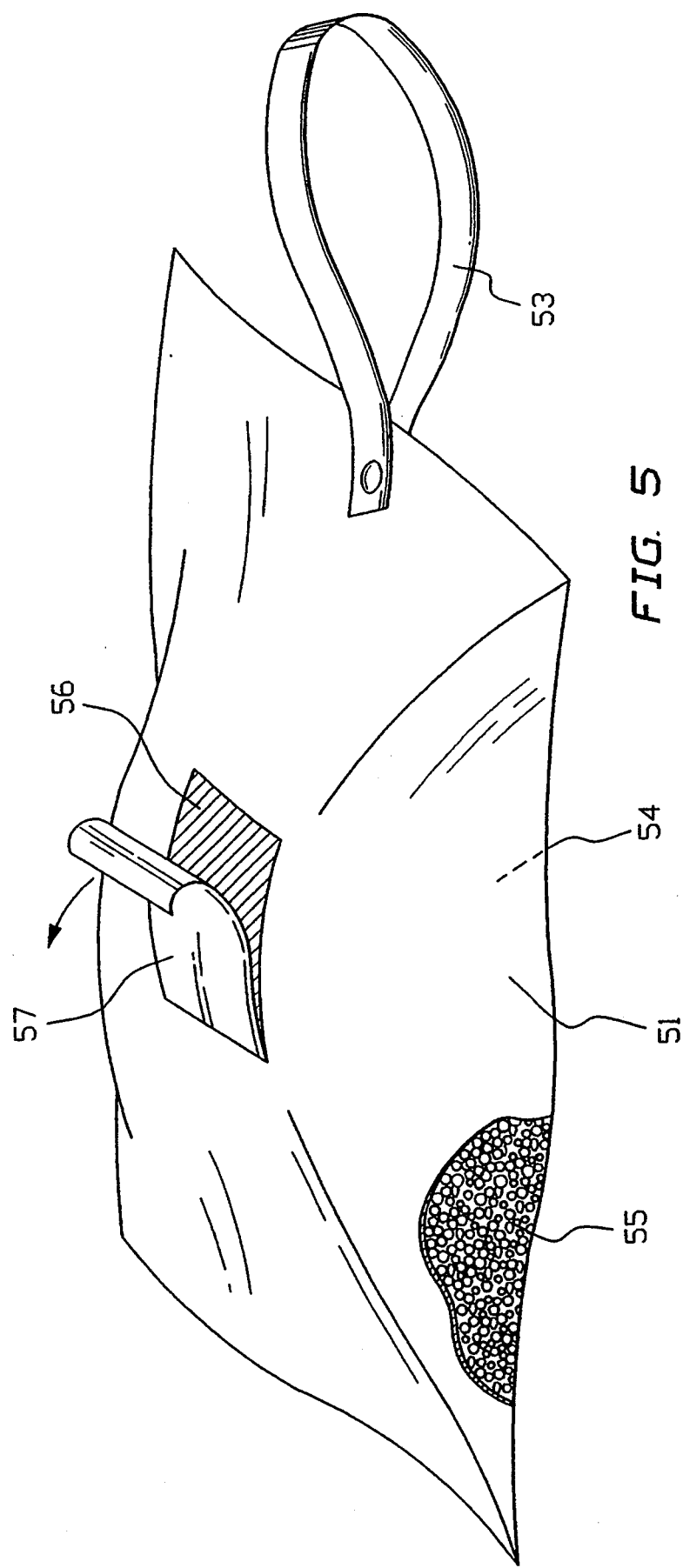
FIG. 5 details still another preferred embodiment of the fastener using an adhesive pad.

Aside from threaded fasteners, surface adhesives could also be used to attach the device to the cushion as FIG. 5 depicts In FIG. 5, a preferred embodiment shows a dry, non-transferring adhesive pad 56 positioned on the top side of the cushion. This adhesive may be protected by a removable cover 57 when not in use. Moreover, the adhesive pad could be replaced when its adhesiveness diminished. In addition to adhesive, Velcro or a similar product could be used to hold the device steady.

Figure 6:
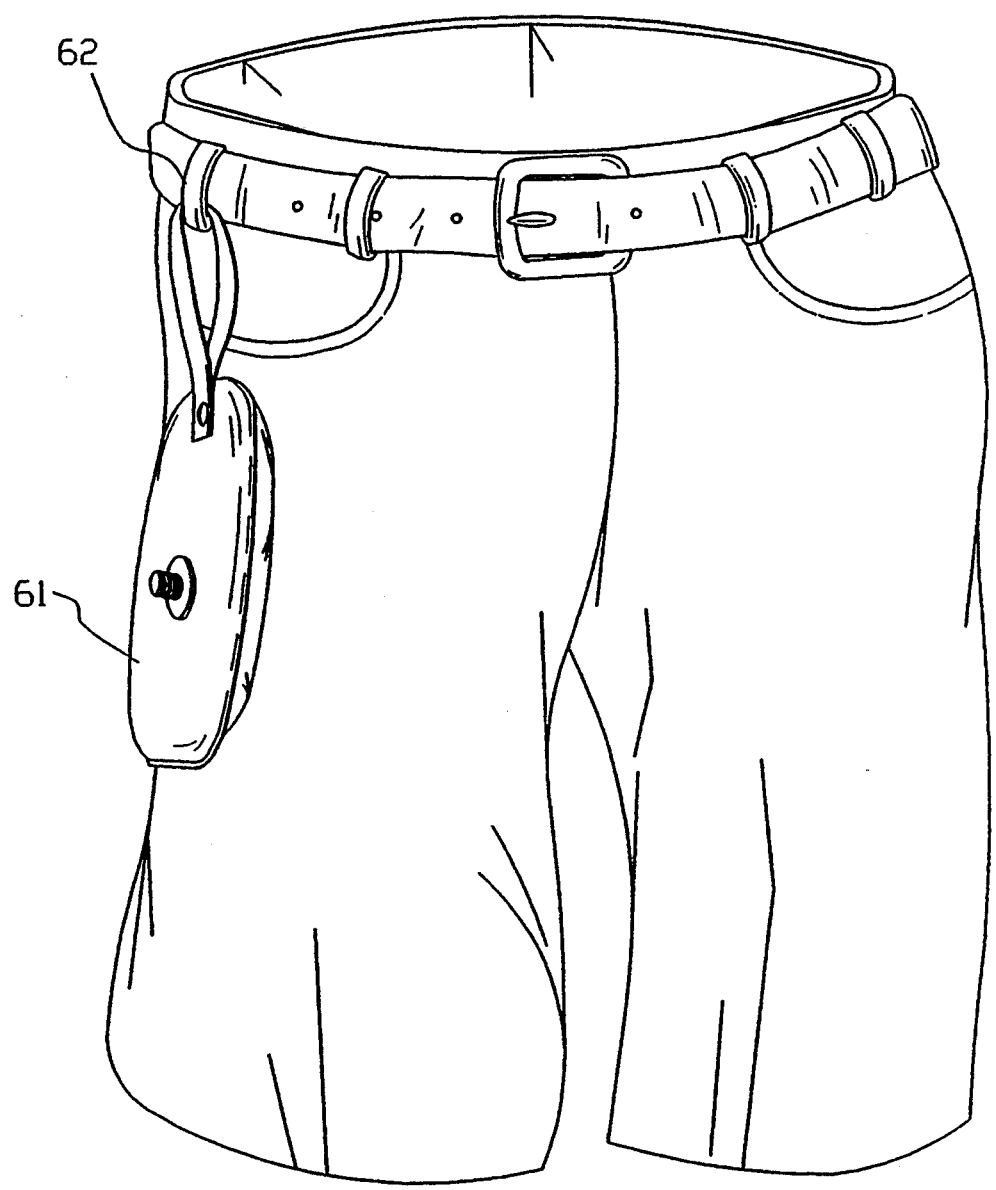
FIG. 6 shows the strap being used in the transportation of the pod.
Figure 7:
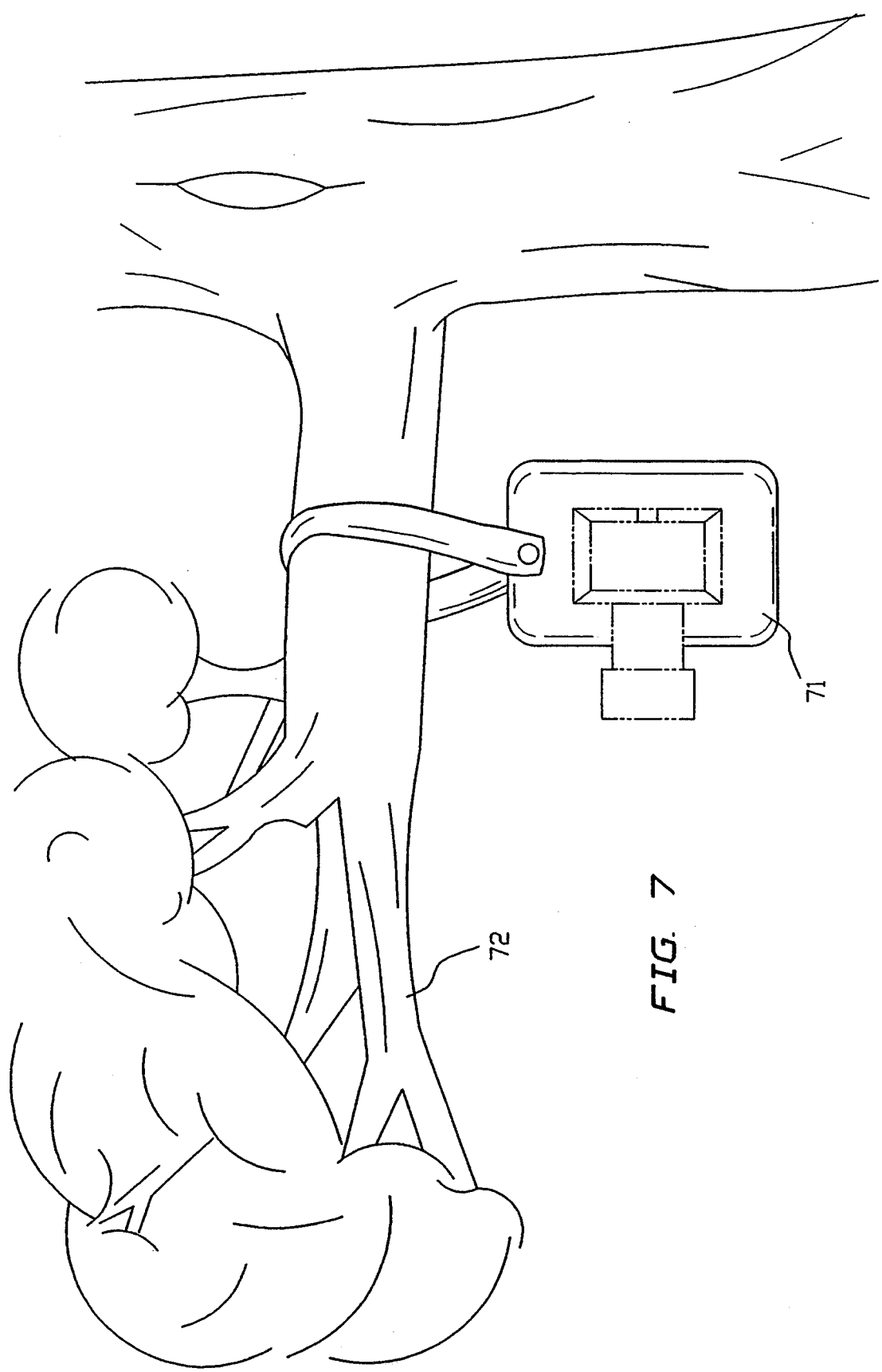
FIG. 7 shows an innovative use for the strap when taking a photograph.

FIGS. 6 and 7 depict the various uses for the strap. In FIG. 6, an omnipositional pod 61 is shown in a carrying position, strapped to a user's belt loop 62. FIG. 7 shows the versatility of the invention. In this particular application, an omnipositional pod 71 is suspended from a tree 72. Indeed, the uses for the present invention—with its distinctive fastener and strap—are limited only by the user's imagination.

FIGS. 2, 3, 4, and 5 present various embodiments of the same invention. These embodiments can be used independent of one another or they can be used in combination. It must be understood that many variations of the invention can be created. The embodiments shown depict the best mode of the invention, but it is obvious that numerous shapes, sizes and orientations can be used for all the parts described. It should be therefore understood that in light of the appended claims, the invention may be practiced other than as specifically described, and individual features described in differing embodiments may be modified, combined or used in orientations other than those shown.

What is claimed is:

1. An omnipositional pod for supporting a camera, said pod comprising:
   a) a cushion for supporting a camera, said cushion has a top side and a bottom side and comprises a pliable material;
   b) a fastener mounted to said cushion, said fastener comprises a threaded stud a top plate integrally mounted to said threaded stud; a bottom plate having an area large enough to adequately anchor said top plate such that said threaded stud remains rigid; and, rivets extending from said top plate, passing through said top side of said cushion, and attaching to said bottom plate, said rivets attach said top and said bottom plates such that said top side is held between them; for fastening to a camera; and
   c) a fluid material contained within said cushion, said fluid material comprises free flowing solid particles to provide adequate support and ballast while allowing high pliability.

2. The pod of claim 1 wherein said fluid material comprises beads of polypropylene and metal shot.

3. The pod of claim 1 wherein said top side and said bottom side comprise a single piece of pliable material folded in half and sewn on three sides to contain said fluid material.

4. The pod of claim 1 wherein said bottom of said cushion consists of a skid resistant material.

5. The pod of claim 1 wherein said top plate contains a rubber stopper at the junction of said threaded stud and said top plate, said rubber stopper is shock resistant to cushion said device from said top plate and skid resistant to restrain said camera from turning on said threaded stud.

6. The pod of claim 1 wherein said top plate contains holes to receive said rivets, said holes sufficiently sized to accommodate the head of said rivets such that said rivets remain below the surface of said top plate.

7. The pod of claim 1 further comprising:
   d) a strap mounted to said cushion, said strap has a strap fastener which allows said strap to fasten such that it forms a loop.

8. The pod of claim 1 wherein said threaded stud contains a swivel device to allow said device to be positioned while the pod remains still.

9. A device combining an omnipositional pod for supporting a camera and a camera, said device comprising:
   a) a cushion for supporting a camera, said cushion has a top side and a bottom side and comprises a pliable material;
   b) a fastener mounted to said cushion, said fastener comprises a threaded stud a top plate integrally mounted to said threaded stud; a bottom plate having an area large enough to adequately anchor said top plate such that said threaded stud remains rigid; and, rivets extending from said top plate, passing through said top side of said cushion, and attaching to said bottom plate, said rivets attach said top and said bottom plates such that said top side is held between them; for fastening to a camera;
   c) a fluid material contained within said cushion, said fluid material comprises free flowing solid particles to provide adequate support and ballast while being highly pliable; and
   d) a camera, said camera fastens to said threaded stud.

10. The device of claim 9 wherein said fluid material comprises beads of polypropylene and metal shot.

11. The device of claim 9 wherein said top side and said bottom side comprise a single piece of pliable material folded in half and sewn on three sides to contain said fluid material.

12. The device of claim 9 wherein said bottom of said cushion consists of a skid resistant material.

13. The device of claim 9 wherein said top plate contains a rubber stopper at the junction of said threaded stud and said top plate, said rubber stopper is shock resistant to cushion said device from said top plate and skid resistant to restrain said device from turning on said threaded stud.

14. The device of claim 9 wherein said top plate contains holes to receive said rivets, said holes sufficiently sized to accommodate the head of said rivets such that said rivets remain below the surface of said top plate.

15. The device of claim 9 further comprising:
   e) a strap mounted to said cushion, said strap has a strap fastener which allows said strap to fasten such that it forms a loop.

16. The device of claim 9 wherein said threaded stud contains a swivel device to allow said device to be positioned while the pod remains still.

* * * * *